(12) United States Patent
Nakayama et al.

(10) Patent No.: US 9,598,611 B2
(45) Date of Patent: Mar. 21, 2017

(54) HIGH PURITY SILICA SOL AND ITS PRODUCTION METHOD

(71) Applicant: JGC Catalysts and Chemicals Ltd., Kawasaki-shi (JP)

(72) Inventors: Kazuhiro Nakayama, Kitakyushu (JP); Akira Nakashima, Kitakyushu (JP); Michio Komatsu, Kitakyushu (JP)

(73) Assignee: JGC Catalysts and Chemicals Ltd., Kawasaki-shi (JP)

( * ) Notice: Subject to any disclaimer, the term of this patent is extended or adjusted under 35 U.S.C. 154(b) by 540 days.

(21) Appl. No.: 13/727,791

(22) Filed: Dec. 27, 2012

(65) Prior Publication Data
US 2014/0013674 A1  Jan. 16, 2014

(30) Foreign Application Priority Data
Dec. 28, 2011  (JP) ................. 2011-287575

(51) Int. Cl.
 *C01B 33/141*  (2006.01)
 *C09G 1/02*  (2006.01)
 *C01B 33/143*  (2006.01)
 *C09K 3/14*  (2006.01)

(52) U.S. Cl.
 CPC ............ *C09G 1/02* (2013.01); *C01B 33/1435* (2013.01); *C09K 3/1409* (2013.01)

(58) Field of Classification Search
 CPC ......... C09G 1/02; C01B 33/113; C01B 33/12; C01B 33/122; C01B 33/124; C01B 33/126; C01B 33/128; C01B 33/14; C01B 33/141; C01B 33/1412; C01B 33/1415; C01B 33/1417; C01B 33/142; C01B 33/143; C01B 33/1435; C01B 33/145; C01B 33/146; C01B 33/1465; C01B 33/148; C01B 33/1485; C01B 33/149; C01B 33/151
 USPC .......................... 516/81, 84; 51/308; 423/335
 See application file for complete search history.

(56) References Cited

U.S. PATENT DOCUMENTS

| | | | | |
|---|---|---|---|---|
| 7,140,201 | B2 * | 11/2006 | Sugiyama ............... | C01B 33/16 65/17.2 |
| 8,585,791 | B2 * | 11/2013 | Nakayama et al. ............ | 51/298 |
| 2003/0005724 | A1 * | 1/2003 | Sugiyama ............... | C01B 33/16 65/17.2 |
| 2004/0192049 | A1 | 9/2004 | Ohno et al. | |
| 2005/0129603 | A1 * | 6/2005 | Szillat et al. ............... | 423/335 |
| 2006/0151854 | A1 * | 7/2006 | Kawase et al. ............... | 257/617 |
| 2007/0075292 | A1 * | 4/2007 | Mahulikar et al. .......... | 252/79.1 |
| 2007/0237701 | A1 * | 10/2007 | Yamakawa ............ | C01B 33/141 423/335 |
| 2008/0115423 | A1 * | 5/2008 | Kashima et al. ................ | 51/308 |
| 2010/0146864 | A1 * | 6/2010 | Nakayama et al. ............ | 51/298 |
| 2011/0314745 | A1 * | 12/2011 | Nakayama et al. ............ | 51/308 |

FOREIGN PATENT DOCUMENTS

| | | | |
|---|---|---|---|
| EP | 0557740 A2 | | 9/1993 |
| JP | 6016414 A | | 1/1994 |
| JP | 11-214338 A | * | 8/1999 |
| JP | 2001294417 A | | 10/2001 |
| JP | 2001294420 A | | 10/2001 |
| JP | 2001302254 A | | 10/2001 |
| JP | 2002173314 A | | 6/2002 |
| JP | 2003089786 A | | 3/2003 |
| JP | 2004189534 A | | 7/2004 |
| JP | 2005060217 A | | 3/2005 |
| JP | 2005060219 A | | 3/2005 |
| JP | 2005298276 A | | 10/2005 |
| JP | 2006036605 A | | 2/2006 |
| JP | 2006045022 A | | 2/2006 |
| JP | 2006104354 A | | 4/2006 |
| JP | 2006202932 A | * | 8/2006 |

OTHER PUBLICATIONS

Machine Translation of Publ. No. JP 2006-202932, published Aug. 2006, Japan patent Office, Tokyo, Japan, obtained online @ http://dossier1.ipdl.inpit.go.jp/AIPN/odse_top_dn.ipdl?N0000=7400 (Downloaded Mar. 19, 2015) pp. 1-14.*
Machine Translation of Publ. No. JP 2003-089786, published Mar. 2003, Japan patent Office, Tokyo, Japan, obtained online @ http://dossier1.ipdl.inpit.go.jp/AIPN/odse_top_dn.ipdl?N0000=7400 (Downloaded Mar. 19, 2015) pp. 1-11.*
Machine Translation of Publ. No. JP2004189534(A), published Jul. 2004, Worldwide ESpacenet, obtained online @ http://worldwide.espacenet.com/?locale=EN_ep (Downloaded Mar. 21, 2015) pp. 1-21.*
Machine Translation of Publ. No. JP 11-214338 A, published Aug. 1999, Japan patent Office, Tokyo, Japan, obtained online @ http://www19.ipdl.inpit.go.jp/PA1/cgi-bin/PA1INDEX (Downloaded Jun. 14, 2007).*
Derwent Abstract on East, week 199945, London: Derwent Publications Ltd., AN 1999-530726, Class L03, JP 11214338 A, (MEMC KK), abstract, pp. 1-2.*

* cited by examiner

*Primary Examiner* — Daniel S Metzmaier
(74) *Attorney, Agent, or Firm* — The Webb Law Firm

(57) ABSTRACT

A method for producing a high purity silica sol is provided. This method has enabled use of water glass for the starting material, and the resulting silica sol has a reduced metal impurity Cu and Ni content compared to conventional methods. The method comprises (1) ultrafiltration of an aqueous solution of an alkali silicate; (2) ion exchange process for removal of at least a part of cationic components in the purified aqueous solution of an alkali silicate; (3) another ion exchange process using a chelating ion exchange resin to obtain high purity silicate solution; and (4) adjustment of a part of the high purity silicate solution (seed solution) to alkaline pH and mixing of this solution with another part of the solution (feed solution) to produce a high purity silica sol having a Cu concentration and a Ni concentration (in relation to the dry silica) of up to 50 ppb.

4 Claims, No Drawings

HIGH PURITY SILICA SOL AND ITS PRODUCTION METHOD

TECHNICAL FIELD

This invention relates to a high purity silica sol and its production method.

BACKGROUND ART

Silica sols which are substantially free from metal impurities (Fe, Cr, Ni, Cu, etc.) have been proposed. Such high purity silica sol is suitable for use as an abrasive for electronic materials such as semiconductor silicon wafer because presence of such metal impurities in the silica sol results in the dispersion of the metal impurities into the interior of the wafer during polishing of the wafer and loss of wafer quality, and hence, in the poor performance of the semiconductor device formed by using such wafer.

Examples of the high purity silica sol that has been proposed include those disclosed in the Patent Literatures 1 to 3.

Patent Literature 1 discloses a method for producing a colloidal silica comprising the steps of contacting an aqueous solution of an alkali silicate with a cation-exchange resin to prepare an aqueous solution of activated silicic acid, contacting the aqueous solution of activated silicic acid with a chelating agent, allowing development of the colloid particles, and concentrating the silica by ultrafiltration simultaneously with the removal of the chelated metal impurities. Also disclosed is that the colloidal silica produced has a Cu content in relation to silica of up to 100 ppb or a Ni content in relation to silica of up to 1000 ppb.

Patent Literature 2 discloses a production method comprising the steps of preparing a solution of aqueous solution of an alkali metal silicate salt having a strong acid or a salt of a strong acid added thereto, treating the solution with an ion-exchange resin, adding another solution obtained by similar steps to the solution obtained by the ion exchange to prepare a silica sol, treating the resulting silica sol with an ion-exchange resin, and adding ammonia to the resulting silica sol. Also disclosed is that such production method is capable of producing a stable aqueous colloidal silica having an average particle diameter in the range of 10 to 30 mμ, a $SiO_2$ concentration of 30 to 50% by weight, and content of polyvalent metal oxides other than the silica in relation to the silica of up to 300 ppm from an alkali metal silicate salt containing a polyvalent metal oxides as impurities.

Patent Literature 3 discloses a method for producing a high purity colloidal silica comprising the first step of subjecting water glass to cation exchange treatment to prepare an aqueous silica solution, the second step of adding an acid and hydrogen peroxide to the aqueous silica solution to conduct another cation exchange treatment, and the third step of mixing the aqueous silica solution with ammoniac alkali for preparation of the colloidal silica. Also disclosed is that such production method is capable of producing a high purity colloidal silica and a high purity synthetic quartz powder adapted for various applications such as an abrasive agent for a silicon wafer, binding of a ceramic fiber, an adhesion binder for a phosphor in the CRT production, and a gelation agent of an electrolyte in a battery.

CITATION LIST

Patent Literature

[Patent Literature 1] Japanese Patent Application Laid-Open No. 2001-294417

[Patent Literature 2] Japanese Patent Application Laid-Open No. 6-16414

[Patent Literature 3] Japanese Patent Application Laid-Open No. 2002-173314

SUMMARY OF INVENTION

Technical Problem

However, there is a strong demand for the development of a high purity silica sol having a reduced content of the metal impurities.

There is also a demand for use of water glass for the production of a high purity silica sol. Production of a high purity silica sol using water glass has been difficult.

An object of the present invention is to provide a method for producing a high purity silica sol which has enabled use of water glass for the starting material, and which has enabled decrease in the content of Cu and Ni as the metal impurities. Another method of the present invention is to provide a high purity silica sol which has a reduced content of Cu and Ni as the metal impurities.

Solution to Problem

In order to solve the problems as described above, the inventors of the present invention conducted an intensive study and completed the present invention.

The present invention provides the following (1) to (8).
(1) A method for producing a high purity silica sol comprising the steps of
   (1) conducting ultrafiltration of an aqueous solution of an alkali silicate (a) to obtain purified aqueous solution of the alkali silicate (b);
   (2) subjecting the purified aqueous solution of the alkali silicate (b) to an ion exchange process to remove at least a part of cationic components in the purified aqueous solution of the alkali silicate (b) to obtain purified silicate solution;
   (3) subjecting the purified silicate solution to an ion exchange process using a chelating ion exchange resin to obtain high purity silicate solution; and
   (4) adjusting a part of the high purity silicate solution (seed solution) to alkaline pH and mixing this solution with another part of the high purity silicate solution (feed solution) to produce the high purity silica sol having a Cu concentration and a Ni concentration (in relation to the dry silica) of up to 50 ppb.
(2) A method for producing a high purity silica sol according to the above (1) further comprising the step of adding an oxidizing agent to at least one member selected from the group consisting of the aqueous solution of an alkali silicate (a), the purified aqueous solution of the alkali silicate (b), and the purified silicate solution.
(3) A method for producing a high purity silica sol according to the above (2) wherein the oxidizing agent is aqueous solution of hydrogen peroxide.
(4) A method for producing a high purity silica sol according to any one of the above (1) to (3) wherein the step (3) is preferably a step comprising adjusting pH of the purified silicate solution to the range of up to 2, and subjecting the purified silicate solution to an ion exchange process using a chelating ion exchange resin to produce the high purity silicate solution.
(5) A high purity silica sol having an average particle size of 2 to 300 nm, and a Cu concentration and a Ni concentration (in relation to the dry silica) of up to 50 ppb.

(6) A high purity silica sol of the above (5) produced by the production method of any one of the above (1) to (4).
(7) An abrasive composition containing the high purity silica sol of the above (5) or (6).
(8) An abrasive composition according to the above (7) further comprising at least one member selected from the group consisting of abrasive aid, surfactant, heterocyclic compound, pH adjusting agent, and buffering agent.

Advantageous Effects of Invention

The present invention provides a method for producing a high purity silica sol which has enabled use of water glass for the starting material, and which is capable of producing a high purity silica sol having a reduced content of Cu and Ni as the metal impurities. The present invention also provides a high purity silica sol having a reduced content of Cu and Ni as the metal impurities.

DESCRIPTION OF EMBODIMENTS

Next, the present invention is described in detail.
The present invention provides a method for producing a high purity silica sol comprising the following steps (1) to (4).
(1) the step of conducting ultrafiltration of an aqueous solution of an alkali silicate (a) to obtain purified aqueous solution of the alkali silicate (b),
(2) the step of subjecting the purified aqueous solution of the alkali silicate (b) to an ion exchange process to remove at least a part of cationic components in the purified aqueous solution of the alkali silicate (b) to obtain purified silicate solution,
(3) the step of subjecting the purified silicate solution to an ion exchange process using a chelating ion exchange resin to obtain high purity silicate solution, and
(4) the step of adjusting a part of the high purity silicate solution (seed solution) to alkaline pH and mixing this solution with another part of the high purity silicate solution (feed solution) to produce the high purity silica sol having a Cu concentration and a Ni concentration (in relation to the dry silica) of up to 50 ppb.

Such method for producing a high purity silica sol is hereinafter also referred to as "the production method of the present invention".

The production method of the present invention preferably further comprises the step of adding an oxidizing agent to at least one member selected from the group consisting of the aqueous solution of an alkali silicate (a), the purified aqueous solution of the alkali silicate (b), and the purified silicate solution.

In the production method of the present invention, the oxidizing agent is preferably aqueous solution of hydrogen peroxide.

In the production method of the present invention, the step (3) is preferably a step comprising adjusting pH of the purified silicate solution to the range of up to 2, and subjecting the purified silicate solution to an ion exchange process using a chelating ion exchange resin to produce the high purity silicate solution.

The present invention also provides a high purity silica sol having an average particle size of 2 to 300 nm, and a Cu concentration and a Ni concentration (in relation to the dry silica) of up to 50 ppb.

Such high purity silica sol is hereinafter also referred to as "the silica sol of the present invention".

The silica sol of the present invention can be obtained by using the production method of the present invention.

First, the production method of the present invention is described.

<Step (1)>

The step (1) of the production method of the present invention is described.

In the step (1), an aqueous solution of an alkali silicate (a) containing an alkali silicate is first prepared.

The aqueous solution of an alkali silicate (a) is water having an alkali silicate such as sodium silicate, potassium silicate, or lithium silicate dissolved therein, and an alkali means an alkali metal such as Li, Na, K, Rb, Cs, or Fr.

An exemplary aqueous solution of an alkali silicate (a) is "water glass" which is sodium silicate dissolved in water.

Concentration of the $SiO_2$ in the aqueous solution of an alkali silicate (a) is not particularly limited. The $SiO_2$ concentration, however, is preferably 15 to 30% by weight, more preferably 20 to 28% by weight, and most preferably 22 to 26% by weight.

The concentration of the $SiO_2$ in the aqueous solution of an alkali silicate (a) is determined by adding hydrochloric acid and aqueous solution of sodium hydroxide to the aqueous solution of an alkali silicate (a) for neutralization, and adding solution of potassium fluoride and conducting titration of the generated alkaline content with hydrochloric acid. More specifically, $SiO_2$ concentration is measured by the following reaction:

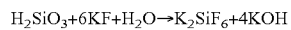

$$H_2SiO_3 + 6KF + H_2O \rightarrow K_2SiF_6 + 4KOH$$

The concentration of the alkaline content in the aqueous solution of an alkali silicate (a) is determined, for example, in the case of aqueous solution of sodium silicate, by adding hydrochloric acid to the aqueous solution of sodium silicate for neutralization, and further adding excessive hydrochloric acid, and conducting back titration with sodium hydroxide solution to thereby determine the amount of the $Na_2O$. The measurement is conducted in similar manner in the case of other alkalis.

The method used for producing the aqueous solution of an alkali silicate (a) is not particularly limited, and a method known in the art may be used for the production. For example, an aqueous solution of an alkali silicate (a) may be obtained by dissolving solid sodium silicate (sodium silicate cullet or the like) in aqueous solution of sodium hydroxide, and more specifically, by dissolving sodium silicate cullet in aqueous solution of sodium hydroxide at a high temperature (for example, a temperature of at least 150° C.) for a sufficient time (for example, at least 30 minutes) to produce an aqueous solution of sodium silicate.

The aqueous solution of an alkali silicate (a) may preferably have a molar concentration ratio of the $SiO_2$ to the alkali oxide ($SiO_2$/alkali oxide) of 1 to 7, more preferably 2 to 6, still more preferably 2.5 to 5, and most preferably 3.0 to 3.5. Use of an excessively low molar concentration ratio is not preferable because increase in the amount of the alkali metal removed in the cation exchange step is uneconomical. Also, an excessively high molar concentration is not preferable, since the aqueous solution of an alkali silicate (a) will be unstable, and use of such unstable solution is not practical.

As described below, an oxidizing agent is preferably added before the ultrafiltration of the aqueous solution of an alkali silicate (a). The inventors of the present invention have found that, in such a case, the Cu concentration and the Ni concentration are even more reduced in the high purity silica sol produced by the production method of the present invention.

Exemplary oxidizing agents include aqueous solution of hydrogen peroxide, peracetic acid, urea peroxide, nitric acid, iodic acid ($HIO_3$), and ozone, and use of aqueous solution of hydrogen peroxide is preferable.

The same oxidizing agents may be used in the addition of an oxidizing agent to the purified aqueous solution of the alkali silicate (b) or the purified silicate solution as described below, and use of an aqueous solution of hydrogen peroxide is also preferable.

Amount of the oxidizing agent added to the aqueous solution of an alkali silicate (a) is preferably 0.001 to 20% by weight, and more preferably 0.01 to 10% by weight in relation to the dry silica The "content in relation to the dry silica" means weight ratio of the weight of the component of interest (in this case, the oxidizing agent) to the weight of the $SiO_2$ in the silica-containing component (in this case, the aqueous solution of an alkali silicate (a)). In the present invention, the "content in relation to the dry silica" is hereinafter used in such meaning.

In the step (1), ultrafiltration of such aqueous solution of an alkali silicate (a) is conducted.

The ultrafiltration may be accomplished by using an ultrafiltration membrane which has been known in the art. The molecular weight cut-off of the ultrafiltration membrane is preferably 100 to 10000, more preferably 1000 to 9000, and most preferably 3000 to 6000.

A purified aqueous solution of an alkali silicate (b) can be obtained by conducting such ultrafiltration.

Preferably, the resulting purified aqueous solution of the alkali silicate (b) has a $SiO_2$ concentration of 15 to 30% by weight, more preferably 20 to 28% by weight, and still more preferably 20 to 26% by weight.

The $SiO_2$ concentration in the purified aqueous solution of the alkali silicate (b) may be determined as in the case of the $SiO_2$ concentration in the aqueous solution of an alkali silicate (a) as described above.

An oxidizing agent is preferably added to the purified aqueous solution of the alkali silicate (b). The inventors of the present invention have found that such addition of the oxidizing agent results in the further reduction of the Cu concentration and Ni concentration in the high purity silica sol produced by the production method of the present invention.

Amount of the oxidizing agent added to the purified aqueous solution of the alkali silicate (b) is preferably 0.001 to 20% by weight, and more preferably 0.01 to 10% by weight in relation to the dry silica content.

<Step (2)>

Next, the step (2) of the production method of the present invention is described.

In the step (2), the purified aqueous solution of the alkali silicate (b) is subjected to an ion exchange process to remove at least a part of the cationic component in the purified aqueous solution of the alkali silicate (b).

The ion exchange process employed is not particularly limited, and the ion exchange process may be the one known in the art such as the one using a cation exchange resin.

The product of the step (2) as described above is a purified silicate solution having at least a part of the cationic components (and typically, substantially all of the cationic components) removed therefrom.

The $SiO_2$ concentration in the purified silicate solution is preferably 1 to 15% by weight, more preferably 1 to 10% by weight, and still more preferably 2 to 8% by weight.

The $SiO_2$ concentration of the purified silicate solution is the value determined by calcining the purified silicate solution at 1000° C. for 1 hour and weighing the remaining content (solid content) assuming that the entire solid content is the $SiO_2$.

<Step (3)>

Next, the step (3) of the production method of the present invention is described.

In the step (3), the purified silicate solution is subjected to an ion exchange process using a chelating ion exchange resin.

The inventors of the present invention made an intensive study, and found that a silica sol having an extremely low Cu concentration and Ni concentration can be obtained by conducting the ultrafiltration of step (1) and the ion exchange process using a chelating ion exchange resin of step (3).

The purified silicate solution is preferably passed through the chelating ion exchange resin at a space velocity of about 0.5 to 10 $h^{-1}$, more preferably at about 1.5 to 5.0 $h^{-1}$, and more preferably at about 2 to 4 $h^{-1}$.

In the step (3), the ion exchange process using the chelating ion exchange resin is preferably conducted after adding the oxidizing agent to the purified silicate solution. The inventors of the present invention have found that, in such a case, the Cu concentration and the Ni concentration are further reduced in the high purity silica sol produced by the production method of the present invention.

Amount of the oxidizing agent added to the purified silicate solution is preferably 0.001 to 20% by weight, and more preferably 0.01 to 10% by weight in relation to the dry silica.

In the step (3), the ion exchange using the chelating ion exchange resin is preferably conducted after adjusting the pH of the purified silicate solution to the range of up to 2 (and preferably 1 to 2). The inventors of the present invention have found that, in such as case, the Cu concentration and the Ni concentration are further reduced in the high purity silica sol produced by the production method of the present invention.

In the step (3), the ion exchange using the chelating ion exchange resin is still more preferably conducted after adding the oxidizing agent to the purified silicate solution and then adjusting the pH of the purified silicate solution to the range of up to 2. The inventors of the present invention have found that, in such as case, the Cu concentration and the Ni concentration are further reduced in the high purity silica sol produced by the production method of the present invention.

Amount of the oxidizing agent added is preferably in the range of 0.01 to 20% by weight, and more preferably 0.01 to 10% by weight in relation to the dry silica weight.

The means employed for adjusting the pH of the purified silicate solution to the range of up to 2 (and preferably 1 to 2) is not particularly limited, and the pH may be adjusted by adding an acid known in the art such as hydrochloric acid.

A high purity silicate solution is produced by the step (3) as described above.

<Step (4)>

Next, the step (4) of the production method of the present invention is described.

In the step (4), a part of the high purity silicate solution (seed solution) is adjusted to alkaline pH, and then, this solution is mixed with another part of the high purity silicate solution (feed solution).

After separating a part of the high purity silicate solution for use as the seed solution, an alkali may be added to this seed solution to adjust the solution to an alkaline pH. More specifically, the seed solution is adjusted to a pH in the range of 10 to 13 (and preferably 11 to 12), and then mixed with the feed solution by adding the feed solution to the seed solution maintained to the temperature in the range of 20 to 98° C. (more preferably 50 to 95° C., and still more preferably 80 to 90° C.).

Preferably, the feed solution maintained to a temperature in the range of 1 to 30° C., and more preferably 1 to 20° C. is added to the seed solution.

The feed solution is gradually added to the seed solution which had been preferably adjusted to the pH and temperature as described above so that the silica fine particles develop in the seed solution to thereby produce the silica sol.

After adding the feed solution to the seed solution, the solution is preferably maintained at a high temperature (about 80 to 90° C.) for several hours to thereby promote smooth development of the silica fine particles.

The step (4) as described above is capable of producing a high purity silica sol having both the Cu concentration (weight concentration) and the Ni concentration (weight concentration) which are up to 50 ppb in relation to the dry silica.

The Cu concentration and the Ni concentration in relation to the dry silica are preferably low as in the case of the silica sol of the present invention as described below. Also, the average particle diameter is preferably the same as that of the silica sol of the present invention as described below.

The $SiO_2$ concentration (% by weight) of the high purity silica sol is measured by adding sulfuric acid to the high purity silica sol, evaporating the solution to dryness, and weighing the remaining solid after strong heating. Sulfuric acid and hydrofluoric acid are then added, and after evaporating the solution to dryness, remaining solid is weighed. The calculation is conducted by assuming that the weight loss corresponds the weight of the silica ($SiO_2$).

The Cu concentration and the Ni concentration in the high purity silica sol may be measured by adding nitric acid and hydrofluoric acid to the silica sol, heating the solution, evaporating the solution to dryness, dissolving the solid content by the addition of nitric acid and water and heating, and diluting the solution by adding water, and evaluating the concentration with a graphite atomic absorption spectrometer.

After determining the $SiO_2$ concentration, the Cu concentration, and the Ni concentration as described above, the Cu concentration and the Ni concentration in relation to the dry silica are determined as a ratio of Ni concentration and the Cu concentration in relation to the dry silica.

Next, the silica sol of the present invention is described.

The silica fine particles contained in the silica sol of the present invention has an average particle diameter of 2 to 300 nm, preferably 5 to 100 nm, and more preferably 10 to 80 nm.

In the present invention, the average particle diameter of the silica fine particles is the one obtained by conducting the measurement according to Sears method.

Sears method is a method conducted by the following procedures 1) to 6).

1) The sample at an amount corresponding to 1.5 g of $SiO_2$ is collected in a beaker, and transferred to a thermostatic reactor at 25° C. Pure water is added to a volume of 90 ml. The following procedure is conducted in a thermostatic reactor maintained at 25° C.

2) 0.1 mol/L aqueous solution of hydrochloric acid is added until the pH is 3.6.

3) 30 g of sodium chloride is added, and the solution is diluted with pure water to 150 ml, and the solution is stirred for 10 minutes.

4) pH electrode is set, and 0.1 mol/L aqueous solution of sodium hydroxide is added dropwise with stirring to adjust the pH to 4.0.

5) The sample with the pH adjusted to 4.0 is titrated with 0.1 mol/L aqueous solution of sodium hydroxide, and amount of the aqueous solution of sodium hydroxide added and the pH value of at least 4 points are recorded in the pH range of 8.7 to 9.3 to depict a calibration curve by plotting the amount of the 0.1 mol/L aqueous sodium hydroxide in the X axis and the corresponding pH value in the Y axis.

6) Volume V (ml) of the 0.1 mol/L aqueous solution of sodium hydroxide consumed from pH 4.0 to 9.0 per 1.5 g of $SiO_2$ is calculated by the following equation (3). Specific surface area is calculated from the following equation (4). Average particle diameter D1 (nm) is calculated by the following equation (5).

$$V=(A \times f \times 100 \times 1.5)/(W \times C) \quad (3)$$

$$SA1=29.0V-28 \quad (4)$$

$$D1=6000/(\rho \times SA1) \quad (5)$$

($\rho$: density of the sample)

In the equation (3),

A: amount (ml)) of the 0.1 mol/L aqueous solution of sodium hydroxide required for titration from pH 4.0 to 9.0 per 1.5 g of $SiO_2$, f: titer of the 0.1 mol/L sodium hydroxide solution, C: $SiO_2$ concentration (%) of the sample, and W: amount of the sample collected (g).

The silica sol of the present invention typically has a Cu concentration (weight concentration) (in relation to the dry silica) of up to 50 ppb, preferably up to 40 ppb, more preferably up to 30 ppb, still more preferably up to 20 ppb, and most preferably up to 10 ppb.

The silica sol of the present invention typically has a Ni concentration (weight concentration) (in relation to the dry silica) of up to 50 ppb, preferably up to 40 ppb, more preferably up to 30 ppb, still more preferably up to 20 ppb, and most preferably up to 10 ppb.

Preferably, the silica sol of the present invention does not substantially contain carbon. More specifically, carbon content of the silica sol of the present invention is preferably up to 0.5% by weight, more preferably up to 0.3% by weight, and still more preferably up to 0.1% by weight.

The carbon content of the silica sol of the present invention is determined by burning the silica sol in a high-frequency furnace of carbon and sulfur analyzer, and analyzing CO and $CO_2$ in the combustion product by infrared absorption.

The $SiO_2$ concentration, Cu concentration, and Ni concentration of the silica sol of the present invention are the values measured by the same procedures as those used in measuring the $SiO_2$ concentration, Cu concentration, and Ni concentration of the high purity silica sol obtained by the production method of the present invention The silica sol of the present invention is a high purity silica sol containing silica fine particles having an average particle diameter as described above, and having a Cu concentration and a Ni concentration as described above.

The dispersion medium used for the silica sol of the present invention is not particularly limited. The dispersion medium, however, is preferably an aqueous medium, and more preferably water.

Also, the silica sol of the present invention is not particularly limited for its concentration of the solid content. The concentration, however, is preferably 5 to 60% by weight, more preferably 10 to 50% by weight, and still more preferably 20 to 40% by weight.

Also, the pH of the silica sol of the present invention is not particularly limited. The pH is preferably 8 to 12, and more preferably 9 to 11.

The silica sol of the present invention may contain a stabilizer known in the art such as HCl and NaOH.

The method used for producing the silica sol of the present invention is not particularly limited while it may be produced by the production method of the present invention.

The silica sol of the present invention is well adapted for use as an abrasive.

An abrasive composition containing the silica sol of the present invention is suitable for use as an abrasive of electronic materials such as semiconductor silicon wafer since the Ni and the Cu concentrations are lower than those of conventional abrasive.

Preferably, such abrasive composition may further comprise at least one member selected from the group consisting of an abrasive aid, surfactant, heterocyclic compound, pH adjusting agent, and buffering agent.

EXAMPLES

Example 1

[Purification of Aqueous Solution of Sodium Silicate]

An aqueous solution of sodium silicate having a $SiO_2$ concentration of 24.06% by weight, a $Na_2O$ concentration of 7.97% by weight, a Cu concentration (in relation to the dry silica) of 460 ppb, and Ni concentration (in relation to the dry silica) of 640 ppb (also referred to as "water glass A") was prepared. The $SiO_2$ concentration, $Na_2O$ concentration, Cu concentration, and Ni concentration were measured by the procedure as described above.

This aqueous solution of sodium silicate was filtered by using an ultrafiltration membrane (SEP-1013 manufactured by Asahi Kasei Chemicals Corp. having a molecular weight cut-off of 3000), and purified aqueous solution of an alkali silicate (b) was obtained as the filtrate.

The $SiO_2$ concentration of the purified aqueous solution of the alkali silicate (b) was measured by the procedure as described above. The $SiO_2$ concentration was 23.2% by weight.

[Preparation of Purified Silicate Solution]

Pure water was added to 3880 g of the thus obtained purified aqueous solution of an alkali silicate (b) so that the $SiO_2$ concentration was 5.0% by weight.

18 kg of the resulting purified aqueous solution of the alkali silicate (b) having $SiO_2$ concentration of 5.0% by weight was passed through 6 L of a strongly acidic cation exchange resin (SK1BH manufactured by Mitsubishi Chemical Corporation) at a space velocity of 3.0 $h^{-1}$ to obtain 18 kg of purified silicate solution having a pH of 2.7.

The $SiO_2$ concentration of the resulting purified silicate solution was measured by the procedure as described above. The $SiO_2$ concentration was 4.7% by weight.

[Preparation of High Purity Silicate Solution]

Next, 160 g of aqueous solution of hydrogen peroxide (0.56% by weight in relation to the dry silica) was added to 18 kg of the purified silicate solution, and 1% by weight hydrochloric acid was added to adjust the pH to 2. The solution was passed through a chelating ion exchange resin (CR-11 manufactured by Mitsubishi Chemical Corporation) at a space velocity of 3.0 $h^{-1}$ to prepare a high purity silicate solution at a pH of 2.0.

The $SiO_2$ concentration of the resulting high purity silicate solution was 4.5% by weight.

[Production of High Purity Silica Sol]

A part of the resulting high purity silicate solution (414.4 g) was separated for use as the seed solution, and another part of the high purity silicate solution (10.18 kg) was separated for use as the feed solution.

Next, 191.1 g of 5% by weight potassium hydroxide aqueous solution was added to 725.8 g of pure water, and then, the seed solution was added to this solution, and the solution was heated. When the solution reached 83° C., the solution was maintained at this temperature for 30 minutes, and then, the feed solution was added at a constant rate for 11 hours with the temperature maintained. When all of the feed solution was added to the seed solution, the solution was heated for 1 hour to maintain the solution at 83° C., and the solution was then cooled to room temperature to prepare the silica sol. This silica sol was concentrated to 12% by weight by using an ultrafiltration membrane (SIP-1013) manufactured by Asahi Kasei Chemicals Corp., and further concentrated to 30% by weight by using a rotary evaporator to thereby produce a high purity silica sol.

The average particle diameter of the resulting high purity silica sol measured by the Sears method was 17.8 nm.

The Cu concentration (in relation to the dry silica) and the Ni concentration (in relation to the dry silica) of the resulting silica sol were measured by the procedure as described above, and the silica sol had a Cu concentration (in relation to the dry silica) of less than 1 ppb and an Ni concentration (in relation to the dry silica) of 7 ppb.

Example 2

In Example 1, the aqueous solution of sodium silicate was filtered through an ultrafiltration membrane (SEP-1013 having a molecular weight cut-off of 3000) to obtain the purified aqueous solution of an alkali silicate (b) as the filtrate. In Example 2, the same aqueous solution of sodium silicate was filtered through an ultrafiltration membrane (SIP-1013 manufactured by Asahi Kasei Chemicals Corp. having a molecular weight cut-off of 6000) to obtain the purified aqueous solution of an alkali silicate (b) as the filtrate.

Also, in Example 1, aqueous solution of hydrogen peroxide was added to the purified silicate solution, and hydrochloric acid was added to the solution to adjust the pH to 2 before the passing of the solution through the chelating ion exchange resin. In Example 2, the addition of the aqueous solution of hydrogen peroxide, and also, the pH adjustment with the hydrochloric acid were not carried out, and the purified silicate solution was passed through the same chelating ion exchange resin at the same space velocity to obtain a high purity silicate solution at a pH of 2.7. The $SiO_2$ concentration of the resulting high purity silicate solution measured by repeating the procedure as described above was 4.5% by weight.

The procedure of Example 1 was repeated except for those as described above, and the measurement was conducted by as in the case of Example 1.

The resulting silica sol had an average particle diameter of 17.8 nm, a Cu concentration (in relation to the dry silica) of 30 ppb, and a Ni concentration (in relation to the dry silica) of 20 ppb.

Example 3

The procedure of Example 1 was repeated except that an aqueous solution of sodium silicate (hereinafter also referred to as "water glass B") having a $SiO_2$ concentration of 24.64% by weight, a $Na_2O$ concentration of 8.08% by weight, a Cu concentration (in relation to the dry silica) of 690 ppb, and a Ni concentration (in relation to the dry silica) of 240 ppb was used instead of the water glass A used in Example 1.

The procedure of Example 1 was repeated except for those as described above, and the measurement was conducted by as in the case of Example 1.

The resulting silica sol had an average particle diameter of 17.6 nm, a Cu concentration (in relation to the dry silica) of 24 ppb, and a Ni concentration (in relation to the dry silica) of 9 ppb.

Example 4

The procedure of Example 1 was repeated except that an aqueous solution of sodium silicate (hereinafter also referred to as "water glass C") having a $SiO_2$ concentration of 24.43% by weight, a $Na_2O$ concentration of 7.40% by weight, a Cu concentration (in relation to the dry silica) of 450 ppb, and a Ni concentration (in relation to the dry silica) of 160 ppb was used instead of the water glass A used in Example 1.

The procedure of Example 1 was repeated except for those as described above, and the measurement was conducted by as in the case of Example 1.

The resulting silica sol had an average particle diameter of 17.6 nm, a Cu concentration (in relation to the dry silica) of 23 ppb, and a Ni concentration (in relation to the dry silica) of less than 1 ppb.

Example 5

232.8 g of 3.0% by weight aqueous solution of hydrogen peroxide (0.567% by weight in relation to the dry silica) was added to 5 kg of water glass B, and the mixture was thoroughly stirred.

The resulting aqueous solution of sodium silicate having the aqueous solution of hydrogen peroxide added was filtered through an ultrafiltration membrane (SIP-1013 having a molecular weight cut-off of 6000) to obtain purified aqueous solution of the alkali silicate (b) as the filtrate.

Next, pure water was added to the resulting purified aqueous solution of the alkali silicate (b) so that the $SiO_2$ concentration was 5.0% by weight. The resulting 5.0% by weight purified aqueous solution of the alkali silicate (b) was passed through 6 L of a strongly acidic cation exchange resin (SK1BH manufactured by Mitsubishi Chemical Corporation) at a space velocity of 3.0 $h^{-1}$ to obtain a purified silicate solution at a pH of 2.7.

Next, the purified silicate solution was passed through a chelating ion exchange resin (CR-11 manufactured by Mitsubishi Chemical Corporation) at a space velocity of 3.0 $h^{-1}$ to obtain a high purity silicate solution at a pH of 2.7. The $SiO_2$ concentration of the resulting high purity silicate solution measured by the procedure as described above was 4.5% by weight.

The following process was conducted by repeating the procedure of Example 1. More specifically, 191.1 g of 5% by weight potassium hydroxide aqueous solution was added to the pure water, and then, the seed solution was added to the solution, and the solution was heated. When the solution reached 83° C., the solution was maintained at this temperature for 30 minutes, and then, the feed solution was added at a constant rate for 11 hours with the temperature maintained. When all of the feed solution was added to the seed solution, the solution was heated for 1 hour to maintain the solution at 83° C. to thereby produce a high purity silica sol.

The measurement was conducted as in the case of Example 1.

The resulting silica sol had an average particle diameter of 17.6 nm, a Cu concentration (in relation to the dry silica) of 5 ppb, and a Ni concentration (in relation to the dry silica) of less than 1 ppb.

Comparative Example 1

Pure water was added to the water glass A used in Example 1 so that the $SiO_2$ concentration was 5.0% by weight.

18 kg of the resulting 5.0% by weight aqueous solution of sodium silicate was passed through 6 L of a strongly acidic cation exchange resin (SK1BH manufactured by Mitsubishi Chemical Corporation) at a space velocity of 3.0 $h^{-1}$ to obtain 18 kg of silicate solution.

The $SiO_2$ concentration of the resulting silicate solution was measured by the procedure as described above. The $SiO_2$ concentration was 4.7% by weight. This silicate solution was diluted with pure water to 4.5% by weight.

Next, a part of the thus obtained silicate solution (414.4 g) was separated for use as the seed solution, and another part of the silicate solution (10.63 kg) was separated for use as the feed solution.

The following process was conducted by repeating the procedure of Example 1. More specifically, 191.1 g of 5% by weight potassium hydroxide aqueous solution was added to pure water, and then, the seed solution was added to the solution, and the solution was heated. The solution was maintained at this temperature for 30 minutes, and then, the feed solution was added at a constant rate for 11 hours with the temperature maintained. When all of the feed solution was added to the seed solution, the solution was heated for 1 hour to maintain the solution at 83° C. to thereby produce a silica sol.

The measurement was conducted by as in the case of Example 1.

The resulting silica sol had an average particle diameter of 17.6 nm, a Cu concentration (in relation to the dry silica) of 235 ppb, and a Ni concentration (in relation to the dry silica) of 610 ppb.

Comparative Example 2

Pure water was added to the water glass A used in Example 1 so that the $SiO_2$ concentration was 5.0% by weight.

18 kg of the resulting 5.0% by weight aqueous solution of sodium silicate was passed through 6 L of a strongly acidic cation exchange resin (SK1BH manufactured by Mitsubishi Chemical Corporation) at a space velocity of 3.0 $h^{-1}$ to obtain 18 kg of silicate solution. The $SiO_2$ concentration of the resulting silicate solution was measured by the procedure as described above. The $SiO_2$ concentration was 4.7% by weight.

Next, 18 kg of the silicate solution was passed through a chelating ion exchange resin (CR-11 manufactured by Mitsubishi Chemical Corporation) at a space velocity of 3.0 h$^{-1}$ to obtain an ion-exchanged silicate solution which had passed through the chelating ion exchange resin at a pH of 2.7. The $SiO_2$ concentration was 4.5% by weight.

Next, a part of the thus obtained ion-exchanged silicate solution which had passed through the chelating ion exchange resin (414.4 g) was separated for use a the seed solution, and another part of the ion-exchanged silicate solution which had passed through the chelating ion exchange resin (10.63 kg) was separated for use as the feed solution.

The following process was conducted by repeating the procedure of Example 1. More specifically, 191.1 g of 5% by weight potassium hydroxide aqueous solution was added to pure water, and then, the seed solution was added to the solution, and the solution was heated. The solution was maintained at this temperature for 30 minutes, and then, the feed solution was added at a constant rate for 11 hours with the temperature maintained. When all of the feed solution was added to the seed solution, the solution was heated for 1 hour to maintain the solution at 83° C. to thereby produce a silica sol.

The measurement was conducted by as in the case of Example 1.

The resulting silica sol had an average particle diameter of 17.7 nm, a Cu concentration (in relation to the dry silica) of 80 ppb, and a Ni concentration (in relation to the dry silica) of 150 ppb.

Comparative Example 3

The procedure of Comparative Example 2 was repeated except that water glass B was used instead of water glass A. The measurement was also conducted by repeating the procedure of Comparative Example 2.

The resulting silica sol had an average particle diameter of 17.8 nm, a Cu concentration (in relation to the dry silica) of 105 ppb, and a Ni concentration (in relation to the dry silica) of 187 ppb.

Comparative Example 4

The procedure of Comparative Example 2 was repeated except that water glass C was used instead of water glass A. The measurement was also conducted by repeating the procedure of Comparative Example 2.

The resulting silica sol had an average particle diameter of 17.6 nm, a Cu concentration (in relation to the dry silica) of 113 ppb, and a Ni concentration (in relation to the dry silica) of 97 ppb.

TABLE 1

| Water glass | $SiO_2$ (%) | $Na_2O$ (%) | Molar ratio | Cu (in relation to the dry silica, ppb) | Ni (in relation to the dry silica, ppb) |
|---|---|---|---|---|---|
| A | 24.06 | 7.97 | 3.12 | 460 | 640 |
| B | 24.64 | 8.08 | 3.15 | 690 | 240 |
| C | 24.43 | 7.40 | 3.41 | 450 | 160 |

TABLE 2

| | Water glass | Purification by ultra-filtration | $H_2O_2$ treatment | pH adjustment of silicate solution | Ion exchange by chelating resin |
|---|---|---|---|---|---|
| Example 1 | A | Molecular weight, 3000 | Yes | Yes | Yes |
| Example 2 | A | Molecular weight, 6000 | No | No | Yes |
| Example 3 | B | Molecular weight, 6000 | No | No | Yes |
| Example 4 | C | Molecular weight, 6000 | No | No | Yes |
| Example 5 | B | Molecular weight, 6000 | Yes | No | Yes |
| Comparative Example 1 | A | No | No | No | No |
| Comparative Example 2 | A | No | No | No | Yes |
| Comparative Example 3 | B | No | No | No | Yes |
| Comparative Example 4 | C | NO | NO | No | Yes |

TABLE 3

| | Particle size (nm) | Cu (in relation to the dry silica, ppb) | Ni (in relation to the dry silica, ppb) |
|---|---|---|---|
| Example 1 | 17.8 | <1 | 7 |
| Example 2 | 17.8 | 30 | 20 |
| Example 3 | 17.6 | 24 | 9 |
| Example 4 | 17.6 | 23 | <1 |
| Example 5 | 17.6 | 5 | <1 |
| Comparative Example 1 | 17.6 | 235 | 610 |
| Comparative Example 2 | 17.7 | 80 | 150 |
| Comparative Example 3 | 17.8 | 105 | 187 |
| Comparative Example 4 | 17.6 | 113 | 97 |

In Examples 1 to 5, the aqueous solution of sodium silicate was filtered through an ultrafiltration membrane, and the purified silicate solution was further passed through the chelating ion exchange resin. For the high purity silica sols obtained in such Examples 1 to 5, both the Cu concentration and the Ni concentration in relation to the dry silica were up to 50 ppb. More specifically, the Cu concentration in relation to the dry silica was up to 30 ppb, and simultaneously, the Ni concentration in relation to the dry silica was up to 20 ppb.

In Example 1, the aqueous solution of sodium silicate was filtered through an ultrafiltration membrane, and after adding aqueous solution of hydrogen peroxide to the purified silicate solution and further adding hydrochloric acid for adjustment of the pH to 2, the solution was passed through the chelating ion exchange resin. The Cu concentration and the Ni concentration in relation to the dry silica were even lower in the high purity silica sol obtained in such Example 1, and both the Cu concentration and the Ni concentration were up to 10 ppb.

In Example 5, aqueous solution of hydrogen peroxide was added to the aqueous solution of sodium silicate, and the solution was filtered through an ultrafiltration membrane, and then, passed through the chelating ion exchange resin. The Cu concentration and the Ni concentration in relation to the dry silica were even lower in the high purity silica sol obtained in such Example 5, and both the Cu concentration and the Ni concentration were up to 5 ppb.

In contrast, the silica sol obtained in Comparative Examples 1 to 4 exhibited high Cu and Ni concentration, that is, the Cu concentration in relation to the dry silica of 80 to 235 ppb, and the Ni concentration in relation to the dry silica of 97 to 610 ppb.

The invention claimed is:

1. A method for producing a high purity silica sol comprising the steps of
    (1) conducting ultrafiltration of an aqueous solution of an alkali silicate (a) to obtain purified aqueous solution of the alkali silicate (b);
    (2) subjecting the purified aqueous solution of the alkali silicate (b) to an ion exchange process to remove at least a part of cationic components in the purified aqueous solution of the alkali silicate (b) to obtain a purified silicate solution (c);
    (3) subjecting the purified silicate solution (c) to an ion exchange process using a chelating ion exchange resin to obtain a high purity silicate solution (d); and
    (4) adjusting a first part of the high purity silicate solution to alkaline pH to form an intermediate solution, and mixing the intermediate solution with a second part of the high purity silicate solution to produce the high purity silica sol (e) having a Cu concentration of up to 50 ppb, based on dry silica weight, and a Ni concentration of up to 50 ppb, based on dry silica weight.

2. A method for producing a high purity silica sol according to claim 1 further comprising the step of adding an oxidizing agent to at least one member selected from the group consisting of the aqueous solution of an alkali silicate (a), the purified aqueous solution of the alkali silicate (b), and the purified silicate solution (c).

3. A method for producing a high purity silica sol according to claim 2 wherein the oxidizing agent is aqueous solution of hydrogen peroxide.

4. A method for producing a high purity silica sol according to claim 1 wherein the step (3) is a step comprising adjusting pH of the purified silicate solution (c) to the range of up to 2, thereby forming a pH adjusted purified silicate solution (c'), and subjecting the pH adjusted purified silicate solution (c') to an ion exchange process using a chelating ion exchange resin to produce the high purity silicate solution (d).

* * * * *